(12) United States Patent
Kimura et al.

(10) Patent No.: US 6,956,074 B1
(45) Date of Patent: Oct. 18, 2005

(54) POLYURETHANE COMPOSITION

(75) Inventors: Kenji Kimura, Yokohama (JP);
Kanako Fukuda, Sakai (JP); Mutsuko Higo, Toyonaka (JP); Kunihito Miyake, Yamatokoriyama (JP)

(73) Assignee: Sumitomo Chemical Company, Ltd., Osaka (JP)

( * ) Notice: Subject to any disclaimer, the term of this patent is extended or adjusted under 35 U.S.C. 154(b) by 0 days.

(21) Appl. No.: 09/529,717

(22) PCT Filed: Aug. 19, 1999

(86) PCT No.: PCT/JP99/04455

§ 371 (c)(1),
(2), (4) Date: Aug. 22, 2000

(87) PCT Pub. No.: WO00/11087

PCT Pub. Date: Mar. 2, 2000

(30) Foreign Application Priority Data

Aug. 21, 1998 (JP) ................................ 10-235710
Apr. 30, 1999 (JP) ................................ 11-124523

(51) Int. Cl.$^7$ .......................... C08K 5/12; C08K 5/13; C08K 5/20; C08L 75/04

(52) U.S. Cl. .............. 524/230; 524/291; 524/299; 524/323; 524/333; 524/339; 524/342; 524/343; 524/351; 524/590; 524/728; 524/738; 524/739; 524/740; 524/741; 524/871; 528/48; 528/49; 528/52; 528/906

(58) Field of Search .................. 524/230, 291, 524/299, 323, 333, 339, 342, 343, 351, 728, 524/736, 738, 739, 740, 741, 871, 590; 528/48, 528/49, 52, 906

(56) References Cited

U.S. PATENT DOCUMENTS

| 3,382,202 A | * | 5/1968 | Forrester et al. | ............ 524/230 |
| 3,533,994 A | * | 10/1970 | Stewart et al. | ............. 524/230 |
| 3,639,333 A | * | 2/1972 | Baitinger | .................... 524/230 |
| 4,721,744 A | | 1/1988 | Ishii et al. | ..................... 524/91 |

FOREIGN PATENT DOCUMENTS

| JP | 46-27874 | * | 8/1971 |
| JP | 55-78048 | * | 6/1980 |
| JP | 57-108154 | * | 7/1982 |
| JP | 58-154746 | * | 9/1983 |
| JP | 61-231049 A | | 10/1986 |
| JP | 62-148553 | * | 7/1987 |
| JP | A-2-22360 A | | 1/1990 |
| JP | 3-146563 | * | 6/1991 |
| JP | 6-93070 | * | 4/1994 |
| JP | A-6-173112 A | | 6/1994 |

OTHER PUBLICATIONS

Abstract of Japan of JP-A-6-173112 A, Jun. 21, 1994.
Abstract of Japan of JP-A-22360 A, Jan. 25, 1990.
Abstract of Japan of JP-61-231049 A, Oct. 15, 1986.

* cited by examiner

*Primary Examiner*—Rabon Sergent
(74) *Attorney, Agent, or Firm*—Kendrew H. Colton, Esq.; Fitch Even Tabin & Flannery

(57) ABSTRACT

There is a provided a polyurethane composition, which exhibits an excellent property of preventing discoloring or coloring not only by oxidized nitrogen gases but also by heat, characterized in that (A) a hindered phenol antioxidant, and
(B) an amide represented by the following general formula (I):

$$R_1\text{---}CONH_2 \qquad (I)$$

wherein $R_1$ represents an alkyl group having 12 to 21 carbon atoms is compounded in the polyurethane.

21 Claims, No Drawings

POLYURETHANE COMPOSITION

This application is the national phase of international application PCT/JP99/04455 filed Aug. 19, 1999 which designated the U.S.

TECHNICAL FIELD

The present invention relates to a polyurethane composition, and more precisely, a polyurethane composition characterized in that a hindered phenol antioxidant and a specific amide compound is compounded in a polyurethane.

BACKGROUND OF THE INVENTION

Polyurethanes are usually obtained by a polyaddition reaction of a polyisocyanate and a polyhydroxy compound, and are used in a number of fields including fibers, films, foams, leathers, paints, adhesives and the like, because of their excellent physical properties with elasticity.

It has been known, however, that polyurethanes are liable to be discolored or colored, for example, caused by oxidized nitrogen gases. Particularly, when polyurethanes are produced for fiber-use, discoloring or coloring occurs in routine uses such as a use in clothing. Therefore, a demand exists for a superior property of preventing discoloring or coloring.

In addition, it has been known that polyurethane is liable to be discolored or colored by heat and is yellowed by thermal history during the course of production, processing and the like. Therefore, a demand also exists for a property of preventing discoloring or coloring caused by heat.

As a composition for preventing discoloring or coloring of polyurethanes by oxidized nitrogen gases, heat or the like, a composition in which a hindered phenol antioxidant and a semicarbazide compound are compounded in polyurethane has been proposed (Japanese Patent Publication No. 2,625,508).

It had, however, not only a problem that a property of preventing discoloring or coloring by oxidized nitrogen gases was insufficient but also a problem that a property of preventing discoloring or coloring by heat was insufficient.

In addition, as a composition for preventing discoloring or coloring of polyurethanes by oxidized nitrogen gases or the like, a composition in which an amide is compounded (JP-A-46-27874), a composition in which a hindered phenol antioxidant is compounded (JP-B-6-35538) and the like have been proposed. However, the former composition had a problem that discoloring or coloring by heat occurred, and the latter composition had a problem that a property of preventing discoloring or coloring by oxidized nitrogen gases was insufficient.

DESCRIPTION OF THE INVENTION

Under these circumstances, the present inventors have conducted extensive studies for finding a polyurethane composition having an excellent property of preventing discoloring or coloring not only by oxidized nitrogen gases but also by heat. As the result, they have surprisingly found that a polyurethane composition having an excellent property of preventing discoloring or coloring not only by oxidized nitrogen gases but also by heat can be obtained by replacing a specific amide with the semicarbazide compound in a composition in which a hindered phenol antioxidant and a semicarbazide compound are compounded, i.e., by compounding a hindered phenol antioxidant and a specific amide. Thus, the present invention has been completed.

That is, the present invention provides a polyurethane composition, excellent in a property of preventing discoloring or coloring, characterized in that
(A) a hindered phenol antioxidant, and
(B) an amide represented by the following general formula (I):

$$R_1-CONH_2 \tag{I}$$

wherein $R_1$ represents an alkyl group having 12 to 21 carbon atoms, are compounded in a polyurethane.

The present invention is described below in detail.

The polyurethane used in the present invention is not particularly limited and may be one obtained by an usual process. It is obtained, for example, by polymerizing a polymer having two or more terminal hydroxyl groups (polyhydroxyl polymer), particularly polyether glycol, polyester glycol or the like, with an organic diisocyanate compound to give an intermediate polymer (prepolymer) having a terminal organic isocyanate group, dissolving the obtained intermediate in an inert solvent, and then adding a polyfunctional hydrogen compound to elongate chains.

The polyhydroxyl polymer herein includes, for example, polyether glycol, such as polypropylene ether glycol, polyethylene ether glycol and polytetramethylene ether glycol, and the like.

The polyester glycol includes, for example, products obtained by polycondensing at least one of aliphatic dicarboxylic acids having about 2 to 10 carbon atoms, such as succinic acid, malonic acid, glutaric acid, adipic acid, pimelic acid, suberic acid, azelaic acid, sebacic acid, dodecanedicarboxylic acid and cyclohexanedicarboxylic acid, with at least one of glycols, such as ethylene glycol, propylene glycol, 1,4-butanediol, 1,6-hexanediol and neopentylene glycol. The polyester glycol includes those obtained by using an aromatic dicarboxylic acid such as terephthalic acid, isophthalic acid and hydroxybenzoic acid as a comonomer component, and lactone polyester polyols obtained by ring-opening polymerization of a cyclic ester such as polycaprolactone polyester.

As the organic diisocyanate, there is used in the present invention, for example, at least one of 2,4-tolylene diisocyanate (TDI), 4,4'-diphenylmethane diisocyanate (MDI), hexamethylene diisocyanate (HDI), 1,4-phenylene diisocyanate (HDI), 1,4-phenylene diisocyanate, 1,4-cyclohexane diisocyanate, 4,4'-dicyclohexylmethane diisocyanate (HMDI), naphthalene diisocyanate, xylylene diisocyanate (XDI) and the like. Preferred diisocyanates are TDI, MDI, HDI, HMDI, XDI and the like.

The polyfunctional hydrogen compound includes, for example, diamines such as ethylenediamine, propylenediamine, hexamethylenediamine, xylylenediamine, 4,4'-diaminodiphenylmethane and hydrazine; diols such as ethylene glycol and 1,4-butanediol; hydroxides such as water, dihydrazide, carbon dihydrazide and β-aminopropionic acid hydrazide.

The inert solvent used in the polymerization reaction includes polar solvents such as N,N-dimethylformamide, N,N-dimethylacetamide, N,N,N',N'-tetramethylurea, N-methylpyrrolidone, dimethylsulfoxide and the like.

The present invention is characterized in that a hindered phenol antioxidant of (A) and an amide represented by the above general formula (I) are compounded. The hindered phenol antioxidant of (A) includes, for example, at least one phenol antioxidant selected from the group of compounds represented by the following general formula (II) or (III):

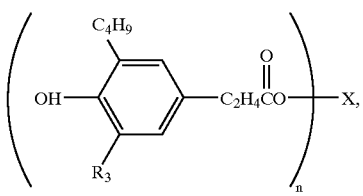

wherein $R_3$ represents an alkyl group having 1 to 8 carbon atoms; n represents an integer of 1 to 4; and X represents an n-valent alcohol residue, having 1 to 18 carbon atoms, which may optionally contain hetero atom and/or cyclic group,

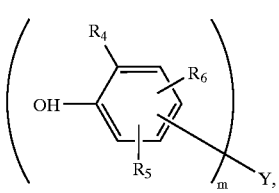

wherein $R_4$ represents an alkyl group having 1 to 8 carbon atoms; $R_5$ and $R_6$ independently represent a hydrogen atom or an alkyl group, having 1 to 8 carbon atoms, which may optionally contain hetero atom; m represents an integer of 1 to 3; y represents an m-valent group, and when m is 1, it represents a hydrogen atom or an alkyl group, having 1 to 18 carbon atoms, which may optionally contain hetero atom, when m is 2, it represents a sulfur atom, an oxygen atom or an alkylidene having 1 to 4 carbon atoms, and when m is 3, it represents an isocyanuric acid-N,N',N"-trimethylene group or a 1,3,5-trimethylbenzene-2,4,6-trimethylene group.

$R_5$ in the phenol antioxidant represented by the formula (II) herein represents an alkyl group having 1 to 8 carbon atoms. Such alkyl group includes a straight chain alkyl group, a branched chain alkyl group or an alkyl group of cyclic structure, such as methyl, ethyl, propyl, isopropyl, butyl, tert-butyl, tert-amyl, tert-octyl, cyclohexyl and 1-methylcyclohexy. Preferably, it is methyl or tert-butyl. It is preferred that the $C_4H_9$ is tert-butyl.

In addition, X represents an n-valent alcohol residue, having 1 to 18 carbon atoms, which may optionally contain hetero atom and/or cyclic group. The alcohol residue refers to a moiety of an alcohol except its OH group. The hetero atom includes, for example, an oxygen atom, a nitrogen atom, a sulfur atom, and the like. The cyclic group includes, for example, 2,4,6,8,10-tetraoxaspiro[5.5]undecane ring, benzene ring, cyclohexane ring and the like.

Representative examples of X include residues of monovalent alcohols such as methyl alcohol, ethyl alcohol, 2-ethylhexyl alcohol, octyl alcohol and octadecyl alcohol; residues of divalent alcohols such as ethylene glycol, triethylene glycol, 2,2'-thiodiethanol and 3,9-bis(1,1-dimethyl-2-hydroxyethyl)-2,4,8-tetraspiro[5.5]undecane; residues of trivalent alcohols such as glycerol and N,N',N"-trihydroxyethylisocyanuric acid; residues of tetravalent alcohols such as pentaerythritol; and so on.

Representative examples of the phenol antioxidant represented by the formula (II) include n-octadecyl 3-(3,5-di-tert-butyl-4-hydroxyphenyl)propionate, 3,9-bis(2-(3-(3-tert-butyl-4-hydroxy-5-methylphenyl)propionyloxy)-1,1-dimethylethyl)-2,4,8,10-tetraoxaspiro[5.5]undecane, triethylene glycol bis(3-(3-tert-butyl-5-methyl-4-hydroxyphenyl)propionate, tetrakis(methylene(3,5-di-tert-butyl-4-hydroxyphenyl)propionate)methane and tris[2(3',5')-tert-butyl-4'-hydroxyhydrocinnamoyloxylethyl] isocyanurate. Amongst them, n-octadecyl 3-(3,5-di-tert-butyl-4-hydroxyphenyl)propionate, 3,9-bis(2-(3-(3-tert-butyl-4-hydroxy-5-methylphenyl)propionyloxy)-1,1-dimethylethyl)-2,4,8,10-tetraoxaspiro[5.5]undecane, tetrakis(methylene(3,5-di-tert-butyl-4 -hydroxyphenyl)propionate)methane, tris[2-(3',5')-tert-butyl-4'-hydroxyhydrocinnamoyloxyethyl]isocyanurate and the like are preferably used.

In addition, $R_4$ in the phenol antioxidant represented by the formula (III) represents an alkyl group having 1 to 8 carbon atoms. Such alkyl group includes a straight chain alkyl group, a branched chain alkyl group or an alkyl group of cyclic structure similar to those described above. Preferably, it is methyl or tert-butyl.

$R_5$ and $R_6$ independently represent a hydrogen atom or an alkyl group, having 1 to 18 carbon atoms, which may optionally contain hetero atom. The alkyl group, having 1 to 18 carbon atoms, which may optionally contain hetero atom, includes, for example, octylthiomethylene, 2-ethylhexylthiomethylene, N,N',-dimethylaminomethylene and the like in addition to a straight chain alkyl group, a branched chain alkyl group or an alkyl group of cyclic structure similar to those described above.

Y represents an m-valent group, and when m is 1, it represents a hydrogen atom or an alkyl group, having 1 to 18 carbon atoms, which may optionally contain hetero atom, when m is 2, it represents a sulfur atom, an oxygen atom or an alkylidene group having 1 to 4 carbon atoms, and when m is 3, it represents an isocyanuric acid-N,N',N"-trimethylene group or a 1,3,5-trimethylbenzene-2,4,6-trimethylene group. The alkyl group, having 1 to 18 carbon atoms, which may optionally contain hetero atom, includes, for example, groups similar to those described above. The alkylidene group having 1 to 4 carbon atoms includes, for example, methylene, ethylidene, propylidene, butylidene and the like.

It is preferred that Y is a hydrogen atom, a methylene group, a butylidene group, a sulfur atom, a 1,3,5-trimethylbenzene-2,4,6-trimethylene group or the like.

Representative examples of the phenol antioxidant represented by the formula (III) include 2,6-di-tert-butyl-4-methylphenol, 2,6-di-tert-butyl-4-ethylphenol, 2,4,6-tri-tert-butylphenol, 2,6-di-tert-butyl-4-hydroxymethylphenol, 2,2'-methylenebis(4-ethyl-6-tert-butylphenol), 2,2'-methylenebis(6-cyclohexyl-4-methylphenol), 2,2'-methylenebis(4,6-di-tert-butylphenol), 2,2'-ethylidenebis(4,6-di-tert-butylphenol), 4,4'-methylenebis(2,6-di-tert-butylphenol), 4,4'-butylidenebis(3-methyl-6-tert-butylphenol), 2,2'-methylenebis(4-methyl-6-tert-butylphenol), 1,3,5-trimethyl-2,4,6-tris(3,5-di-tert-butyl-4-hydroxybenzyl)benzene, 4,4'-thiobis(3-methyl-6-tert-butylphenol), 1,3,5-tris(4-tert-butyl-3-hydroxy-2,6-dimethylbenzyl) isocyanate and 1,3,5-tris(3,5-di-tert-butyl-4-hydroxybenzyl) isocyanate. Amongst them, 1,3,5-tris(4-tert-butyl-3-hydroxy-2,6-dimethyl-benzyl) isocyanate, 1,3,5-tris(3,5-di-tert-butyl-4-hydroxybenzyl) isocyanate, 4,4'-butylidenebis(3-methyl-6-tert-butylphenol), 1,3,5-trimethyl-2,4,6-tris(3,5-di-tert-butyl-4-hydroxybenzyl) benzene and the like are preferably used.

Two or more hindered phenol antioxidants can be used. The amount thereof to be compounded in the polyurethane is usually about 0.05 part by weight to 5 parts by weight.

$R_1$ in the amide of (B) represented by the above general formula (I) represents an alkyl group having 12 to 21 carbon atoms, which includes, for example, dodecyl, tridecyl, tetradecyl, pentadecyl, hexadecyl, heptadecyl, octadecyl, nonadecyl, eicosyl, heneicosyl and the like.

Representative examples of preferred amide (I) include behenic acid amide, stearic acid amide and the like. Use of one wherein $R_1$ is an alkyl having 18 to 21 carbon atoms is particularly preferred, because it is excellent in resistance against extraction by water, and therefore particularly advantageous, for example, in the field of polyurethane for fiber in which dyeing step is included.

Two or more amide (I) can be used. The amount thereof to be compounded in the polyurethane is usually 0.01 part by weight to 10 parts by weight. When the amount of the aliphatic acid amide compounded in polyurethane is less than 0.01 part by weight, the effect is liable to be insufficient; on the other hand, use of an amount exceeding 10 parts by weight is not preferred from the economical viewpoint because an effect corresponding to the compounded amount is not obtained.

In addition, in the present invention, a compounding ingredient, such as ultraviolet absorbers including benzotriazole, benzophenone, benzoate, cyanoacrylate, triazine or the like; stabilizers including hindered amine light stabilizer, phosphorus stabilizer, sulfur stabilizer, benzofranone stabilizer, semicarbazide compounds or the like; and further pigment; dye; and filler can be added, if necessary.

Specific examples of the ultraviolet absorber include the following compounds: 2-(3-tert-butyl-2-hydroxy-5-methylphenyl)-5-chlorobenzotriazole, 2-(3,5-di-tert-butyl-2-hydroxyphenyl)benzotriazole, 2-(2-hydroxy-5-methylphenyl) benzotriazole, 2-(2-hydroxy-5-tert-octylphenyl) benzotriazole, 2-(3,5-di-tert-amyl-2-hydroxyphenyl) benzotriazole, 2-[2-hydroxy-3,5-bis(α,α-dimethylbenzyl) phenyl]benzotriazole, 2-hydroxy-4-octoxybenzophenone, 2-hydroxy-4-methoxybenzophenone, 2,4-di-tert-butylphenyl 3,5-di-tert-butyl-4-hydroxybenzoate, n-hexadecyl 3,5-di-tert-butyl-4-hydroxybenzoate, ethyl 2-cyano-3,3-diphenylacrylate, 2,4-dihydroxybenzophenone, 2,2',4,4'-tetrahydroxybenzophenone, 2-(2-hydroxy-4-octoxyphenyl) benzotriazole, 2-[2-hydroxy-3,5-bis(α,α-dimethylbenzyl) phenyl]-2H-benzotriazole, 2-(3,5-di-tert-butyl-2-hydroxyphenyl)-5-chlorobenzotriazole, a condensate of methyl 3-[3-tert-butyl-5-(2H-benzotriazole-2-yl)-4-hydroxyphenyl]propionate and polyethylene glycol (molecular weight: about 300), a hydroxyphenylbenzotriazole derivative, 2-(4,6-diphenyl-1,3,5-triazine-2-yl)-5-hexyloxyphenol and 2-[4,6-bis(2,4-dimethylphenyl)-1,3,5-triazine-2-yl]-5-octyloxyphenol.

Specific examples of the hindered amine light stabilizer include the following compounds:

bis(2,2,6,6-tetramethyl-4-piperidyl) sebacate, bis(1,2,2,6,6-pentamethyl-4-piperidyl) sebacate, 2-methyl-2-(2,2,6,6-tetramethyl-4-piperidyl)amino-N-( 2,2,6,6-tetramethyl-4-piperidyl)propionamide, bis(1,2,2,6,6-pentamethyl-4-piperidyl) 2-(3,5-di-tert-butyl-4-hydroxybenzyl)-2-n-butylmalonate, tetrakis(2,2,6,6-tetramethyl-4-piperidyl) 1,2,3,4-butanetetracarboxylate, poly[{6-(1,1,3,3-tetramethylbutyl)imino-1,3,5-triazine-2,4-diyl}{(2,2,6,6-tetramethyl-4-piperidyl)imino}hexamethylene{(2,2,6,6-tetramethyl-4-piperidyl)imino}], poly[(6-morpholino-1,3,5-triazine-2,4-diyl){(2,2,6,6-tetramethyl-4-piperidyl) imino}hexamethylene{(2,2,6,6-tetramethyl-4-piperidyl) imino}], a polycondensate of dimethyl succinate and 1-(2-hydroxyethyl)-4-hydroxy-2,2,6,6-tetramethylpiperidine, a polycondensate of N,N-bis(3-aminopropyl)ethylenediamine and 2,4-bis[N-butyl-N-( 1,2,2,6,6-pentamethyl-4-piperidyl) amino]-6-chloro-1,3,5-triazine, a polycondensate of 1,2,2,6, 6-pentamethyl-4-piperidinol and 3,9-bis-(2-hydroxy-1,1-dimethylethyl)-2,4,8,10-tetraoxaspiro[5.5]undecane with 1,2,3,4-butanetetracarboxylic acid and bis(1-octoxy-2,2,6,6-tetramethyl-4-piperidyl) sabacate.

The benzofranone stabilizer includes, for example, 5,7-di-tert-butyl-3-(3,4-dimethylphenyl)-3H-benzofuran-2-one and the like. The semicarbazide stabilizer includes, for example, 1,6-hexamethylenebis(N,N-dimethylsemicarbazide), 4,4'-(methylenedi-p-phenylene)bis(N,N-diethylsemicarbazide), 4,4'-(methylenedi-p-phenylene)bis(N,N-diethylsemicarbazide), 4,4' -(methylenedi-p-phenylene)bis(N,N-diisopropylsemicarbazide), α,α-(p-xylylene)bis(N,N-dimethylsemicarbazide), 1,4-cyclohexylenebis(N,N-dimethylsemicarbazide) and the like.

As to the method for compounding various stabilizers and compounding ingredients in the polyurethane, they can be compounded at any stages in the production steps. For example, they can be added directly to the polyurethane or can be added to a raw material thereof. When a solvent is used, they can be added after dispersing or dissolving in a small amount of the solvent. Preferably, they are compounded after the reaction of the prepolymer with the chain-elongation agent.

According to the present invention, a polyurethane composition having an excellent property of preventing discoloring or coloring by oxidized nitrogen gases and heat can be obtained by compounding a phenol antioxidant and an amide (I) in a polyurethane. They can advantageously be used in the fields of elastic yarn, film, foam, paint, adhesive and the like. Particularly, the effect is more remarkable when used as an elastic yarn.

EXAMPLES

The present invention will now be described in more detail with reference to Examples, which do not limit the scope of the present invention.

[Composition]

| Polyurethane | 100 parts by weight |
|---|---|
| Tested stabilizer | Amount shown in Table 1 and Table 2 (parts by weight) |

AO-1: 3,9-bis(2-(3-(3-tert-butyl-4-hydroxy-5-methylphenyl)propionyloxy)-1,1-dimethylethyl)-2,4,8,10-tetraoxaspiro[5.5]undecane, AO-2: 1,3,5-tris(4-tert-butyl-3-hydroxy-2,6-dimethylbenzyl) isocyanate B-1: behenic acid amide B-2: stearic acid amide C-1: 1,6-hexamethylenebis(N,N-dimethylsemicarbazide)

D-1: 2-[2'-hydroxy-3',5'-bis(α,α-dimethylbenzyl)phenyl] benzotriazole

Example 1

$NO_x$ Resistant Property of Preventing Discoloring or Coloring of Polyurethane

Using a 30 mmΦ-single screw extruder, compositions in Table 1 described below were pelletized by melt-kneading at 185° C. The obtained pellets were exposed to 650 ppm of $NO_x$ gas for 1 hour and the $NO_x$ resistant property of preventing discoloring or coloring was evaluated by degree of yellowing after the exposure. The results are shown in Table 1.

○: No yellowing
x: Deep yellow

In addition, the obtained pellets were subjected to ageing in an oven at 150° C. for 3 hours. By observing the color hue after the ageing, the heat resistant property of preventing discoloring or coloring (coloring by heat) was evaluated by degree of coloring. The results are shown in Table 1.

TABLE 1

| | Example | | | | Comparative example | | | | |
|---|---|---|---|---|---|---|---|---|---|
| Stabilizer | 1 | 2 | 3 | 4 | 1 | 2 | 3 | 4 | 5 |
| AO-1 | 0.5 | 0.5 | — | — | 0.5 | — | — | — | 0.5 |
| AO-2 | — | — | 0.5 | 0.5 | — | 0.5 | — | — | — |
| B-1 | 0.5 | — | 0.5 | — | — | — | 0.5 | — | — |
| B-2 | — | 0.5 | — | 0.5 | — | — | — | 0.5 | — |
| C-1 | — | — | — | — | — | — | — | — | 0.5 |
| Degree of Yellowing | ○ | ○ | ○ | ○ | x | x | ○ | ○ | x |
| Coloring by heat | ○ | ○ | ○ | ○ | ○ | ○ | x | x | x |

○: Thin yellow
x: Deep yellow

Example 2

Anti-leaching Property of Polyurethane in Dyeing

Using a 30 mmΦ-single screw extruder, compositions in Table 2 described below were pelletized by melt-kneading at 185° C. Into a stainless steel vessel were placed 5 g of the obtained pellets and 100 ml of an aqueous solution at pH 5 in which 1% of Avoran IW (manufactured by Bayer), a surfactant, was added. The vessel was tightly closed and extraction was carried out at 120° C. for 2 hours. The pellets before and after the extraction were exposed to 650 ppm of $NO_x$ gas for 1 hour and a change in the $NO_x$ resistant property of preventing discoloring or coloring by extraction was measured by evaluating degree of yellowing after the exposure. The degree of yellowing was evaluated by the following 3 scores. The results are shown in Table 2.

○: No yellowing; Δ: Thin yellow; x: Deep yellow

The fact that no change in the degree of yellowing was observed before and after the extraction means that it is excellent in anti-leaching property.

TABLE 2

| | Example | Comparative example | |
|---|---|---|---|
| Stabilizer | 1 | 1 | 2 |
| AO-1 | 0.5 | 0.5 | 0.5 |
| B-1 | 0.1 | — | — |
| C-1 | — | 0.1 | — |
| D-1 | 0.5 | 0.5 | 0.5 |
| Degree of Yellowing | | | |
| Before extraction | ○ | Δ | X |
| After extraction | ○ | X | X |

What is claimed is:

1. A polyurethane composition comprising a polyurethane having compounded therein:

(a) a hindered phenol in an antioxidant effective amount, wherein said hindered phenol is at least one selected from the group of compounds represented by the following general formula (II):

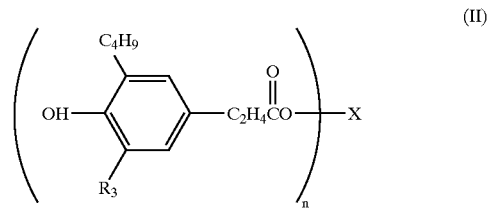

wherein $R_3$ represents a methyl group; n represents an integer of 1 to 4; and X represents an n-valent alcohol residue, having 1 to 18 carbon atoms, which optionally contains a hetero atom and/or a cyclic group, and (b) an amide represented by the following general formula (I):

$$R_1-CONH_2 \quad (I)$$

wherein $R_1$ represents an alkyl group having 12 to 21 carbon atoms.

2. The composition according to claim 1, wherein the amide is at least one selected from the group consisting of stearic acid amide and behenic acid amide.

3. A composition according to claim 2, wherein said hindered phenol is 3,9-bis[2-[3-(3-tert-butyl-4-hydroxy-5-methylphenyl)propionyloxy]-1,1-dimethylethyl]-2,4,8,10-tetraoxaspiro[5.5]undecane.

4. A polyurethane composition according to claim 1, wherein said polyurethane composition further comprises a member selected from the group consisting of a dye and pigment.

5. A polyurethane composition according to claim 1, wherein $R_1$ is an alkyl group having 18 to 21 carbon atoms.

6. A process for preparing a polyurethane composition according to claim 5, wherein said polyurethane is colored with a member selected from the group consisting of a dye and a pigment.

7. A polyurethane composition according to claim 1, wherein n is 2 in the hindered phenol compound represented by formula (II).

8. The composition according to claim 1, wherein about 0.5 part by weight to 5 parts by weight of said hindered phenol, per 100 parts by weight polyurethane, are compounded in said polyurethane.

9. The composition according to claim 1, wherein 0.1 part by weight to 10 parts by weight of said amide, per 100 parts by weight polyurethane, are compounded in said polyurethane.

10. The composition according to claim 1, wherein about 0.5 part by weight to 5 parts by weight of said hindered phenol, per 100 parts by weight polyurethane, and 0.1 part by weight to 10 parts by weight of said amide, per 100 parts by weight polyurethane, are compounded in said polyurethane.

11. The composition according to claim 1, wherein about 0.5 part by weight of said hindered phenol, per 100 parts by weight polyurethane, and about 0.5 part by weight of said amide, per 100 parts by weight polyurethane, are compounded in said polyurethane.

12. The composition according to claim 1, wherein about 0.5 part by weight of said hindered phenol, per 100 parts by weight polyurethane, and 0.1 part by weight of said amide, per 100 parts by weight polyurethane, are compounded in said polyurethane.

13. A process for preventing discoloring or coloring of polyurethane comprising: compounding:
(a) a hindered phenol antioxidant which is at least one selected from the group of compounds represented by the following general formula (II):

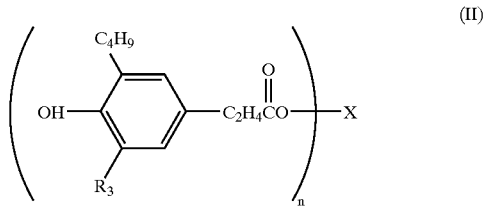

wherein $R_3$ represents a methyl group; n represents an integer of 1 to 4; and X represents an n-valent alcohol residue, having 1 to 18 carbon atoms, which optionally contains a hetero atom and/or a cyclic group, and
(b) an amide represented by the following general formula (I):

$$R_1\text{---}CONH_2 \quad (I)$$

wherein $R_1$ represents an alkyl group having 12 to 21 carbon atoms in a polyurethane.

14. The process according to claim 13, wherein the amide is at least one selected from the group consisting of stearic acid amide and behenic acid amide.

15. The process according to claim 13, wherein about 0.5 part by weight to 5 parts by weight of said hindered phenol, per 100 parts by weight polyurethane, are compounded in said polyurethane.

16. The process according to claim 13, wherein 0.1 part by weight to 10 parts by weight of said amide, per 100 parts by weight polyurethane, are compounded in said polyurethane.

17. The process according to claim 13, wherein about 0.5 part by weight to 5 parts by weight of said hindered phenol, per 100 parts by weight polyurethane, and 0.1 part by weight to 10 parts by weight of said amide, per 100 parts by weight polyurethane, are compounded in said polyurethane.

18. The process according to claim 13, wherein 0.5 part by weight of said hindered phenol, per 100 parts by weight polyurethane, and 0.5 part by weight of said amide, per 100 parts by weight polyurethane, are compounded in said polyurethane.

19. The process according to claim 13, wherein about 0.5 part by weight of said hindered phenol, per 100 parts by weight polyurethane, and 0.1 part by weight of said amide, per 100 parts by weight polyurethane, are compounded in said polyurethane.

20. A fiber obtained from a polyurethane composition according to claim 1.

21. An elastic yarn obtained from a polyurethane composition according to claim 1.

* * * * *